June 18, 1940.  S. D. MOORE  2,205,044
SAFETY STEP TREAD
Filed Dec. 28, 1939

Inventor
Samuel D. Moore.
By Sperr, Donaldson and Hall
Attorney

Patented June 18, 1940

2,205,044

UNITED STATES PATENT OFFICE 2,205,044

SAFETY STEP TREAD

Samuel D. Moore, Cleveland, Ohio

Application December 28, 1939, Serial No. 311,411

8 Claims. (Cl. 280—169)

This invention relates to step assemblies or floorings, and more particularly to such assemblies and floorings as are used on motor buses, trolley buses, street cars, and like vehicles.

The securing and maintenance of satisfactory steps on buses, street cars, and like public conveyances is a major problem in the transit industry, especially from the standpoint of the safety of the passengers. It is a matter of record that a preponderance of the accident claims made daily against the transit companies and bus operators originate in slipping or falling of the passengers in boarding or alighting from a vehicle. The magnitude of this problem is manifest when it is considered that there are approximately 88,442 such vehicles in operation with some twenty-six billion steps being taken each day by passengers in boarding and alighting.

This problem has been given consideration in the past, and many step constructions have been devised and tested. Probably the construction most generally in use is an aluminum alloy step well, the treads of which are made of aluminum with carborundum incorporated in the surface to prevent slipping. Experience has shown that the heavy traffic on such steps rapidly wears away the carborundum surface, leaving a glazed aluminum surface which is extremely hazardous as regards the possibility of slipping thereon. When the aluminum step becomes worn to this extent, it is necessary for the vehicle operator to replace the entire step well which is an expensive operation from both the material and labor standpoints. It is not feasible to make the step in separate sections so that only the elements actually worn need be replaced because the edges of the metal pieces that are attempted to be joined present an even greater hazard by reason of their tendency to be loosened and to turn up at the edges because of the constant stepping thereon. The weaving of the vehicle as it travels over the average road or street causes corresponding deformation in the frame and in the support for the flooring which is oftentimes sufficient to effect crystallization of the metal flooring and consequent breakage.

In overcoming the aforesaid disadvantages, it is a major object of this invention to provide a step assembly that is safer than the assemblies previously used and more economical in that wear is only on certain elements which can be readily replaced.

A further object of this invention is the provision of a novel safety step assembly, the surface of which is not slippery when either wet or dry, portions of the step being formed of a material homogeneously colored throughout to contrast with its surroundings and indicate its specific location regardless of the extent of wear thereon.

Still a further object of this invention is the provision of a novel safety step assembly of a shape reducing the hazard of slipping thereon, the assembly being made of flexible material to yield with the frame of the vehicle as the latter warps in accordance with the travel of the vehicle over the road, and providing a relatively soft surface to reduce the possibility of injury in the event contact is made therewith.

Still a further object of this invention is the provision of a novel step assembly including a nosing strip constructed so that the successive impacts tending to remove it or loosen it are utilized to hold the strip in place during the successive shocks.

Other objects and advantages of the present invention will appear from the following description and claims, as well as the accompanying drawing, wherein Figure 1 is a plan of a portion of a curved step assembly embodying the present invention, a portion of the tread covering being removed to illustrate the nosing or edging construction.

Figure 1:
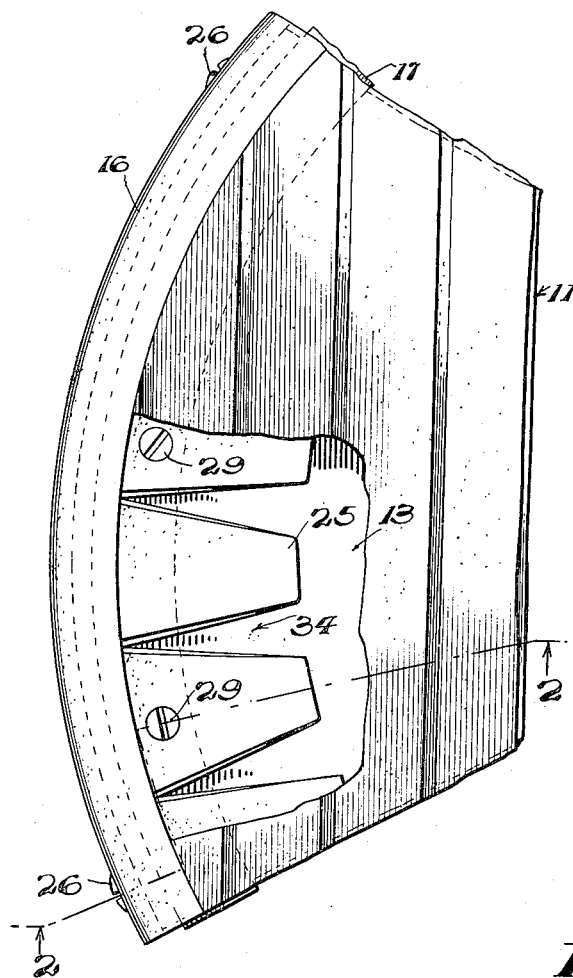

In the drawing, a frame of the step of a bus, trolley, or like vehicle, is generally indicated at 11, such frames being usually formed of metal. The step 11 is generally divided into two sections, namely, a riser 12 and a tread 13. Floor or tread covering 14 is applied to the upper surface of tread 13, the covering preferably being formed of a composition of rubber and fiber and of a character that provides a non-skid surface when either wet or dry. To further remove the possibility of slipping, tread 14 is preferably grooved or slotted, as at 15. Tread covering 14 is preferably secured to the tread of the step by suitable cement which effects the satisfactory seal and prevents the entrance or collection of moisture therebetween.

Figure 3:
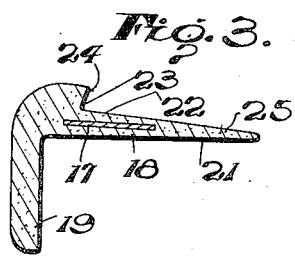
Fig. 3 is a section through the nosing or edging of Figures 1 and 2.

A nosing strip or edging 16 is provided on riser 12 of step 11, edging 16 being preferably shaped in cross section, as shown in Fig. 3, and formed of the same non-skid composition as tread covering 14. Edging 16 is preferably formed by extruding the composition through a die of suitable shape, the edging being extruded in a manner to include a relatively rigid strip such as a metal strip 17 which functions as reinforcing means as well as a part of the securing means for the edging in a manner to be presently described.

Edging 16 is preferably formed in cross section with a horizontal section 18 and a vertical depending section 19. Section 18 is secured to tread 13 of step 11 at the front edge thereof, the under surface 21 of section 18 being preferably straight and smooth to facilitate the cementing thereof to the step frame. The upper surface of section 18 is recessed at 22 to form a notch 23 having a rearwardy extending wall 24 and a tongue 25 tapering toward the rear of the step.

Section 19 is preferably smooth on its under surface so that it can be cemented to the adjacent surface of the step riser. Edging 16 is compounded with coloring material homogeneously distributed therethrough so that no matter how much the edging may be worn, the color will remain. The color selected is in contrast to the color of tread 14, which is also preferably homogeneously colored so as to remain the same color regardless of its condition of wear. For instance, where the latter is black, or of a dark shade, the edging is preferably white. Not only does this provide a contrasting color which definitely distinguishes the front edge of the step from the remainder of the step to positively indicate its location, but also provides a color highly reflective of light, which makes the edge of the step even more visible.

To secure edging 16 in position on step 11 and insure it so remaining, the edging is not only cemented, but is also secured by screws 26 passing through section 19 into tapped apertures 27 or engaging nuts 28 on the inside of the frame and by screws 29 passing through apertures formed in section 18 and insert 17 and similarly engaging tapped apertures 31 or nuts 32.

In forming the step, edging 16 and tread covering 14 are first cut to pattern. Edging 16 is then applied with cement and securely fixed in place by screws 26 and 29. Tread covering 14 is then applied with cement, the forward edge of the tread covering at 33 being shaped to fit within notch 23. As wall 24 of notch 23 inclines rearwardly, the front edge of the tread is thus locked, and it will not have any tendency to raise upwardly and form a projection on which a passenger might conceivably stumble.

In fitting edging 16 to a curved step, tongue 25 with insert 17 is notched, as shown at 34 in Figure 1, whereby the edging can be bent as desired without deforming the tongue portion. Notches 34 are preferably cut to be of a size such that the resultant tab sections will form a complete and flush surface around the curve to receive and support the front edge of the tread covering. In Figure 1, the notches have been shown as larger than necessary for a curve of the radius there shown, this showing being made for the purpose of illustration. In some cases, it may not be desirable to cut the notches as deep as shown to avoid cutting insert 17, or the edging may be formed with insert 17 further forward than shown whereby it will not be cut by deep notching.

While it is to be understood that the relative size of insert 17 and the edging may be varied, in one embodiment of the invention it has been found preferable to make the insert ¾" wide and position it so that about 21/32" extends into tongue 25 and about 3/32" beyond notch 23 into the nose of the edging.

The construction herein shown is of especial advantage in that when the edging wears away it is not necessary to replace the entire covering on the step, as is the case with a metal tread, or any one-piece tread. With the arrangement herein shown, it is only necessary to loosen up the front portion of tread covering 14 with a suitable solvent, move it away from the edging, remove the screws holding the edging, and substitute the new edging therefor. The only item of expense is the new edging, and the labor involved is at a minimum.

By reason of the edging being preferably of white coloring throughout, its visibility is at a maximum at all times despite its age and extent of wear.

Figure 2:
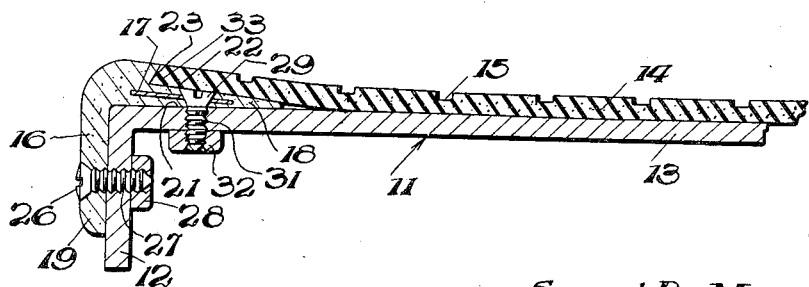
Fig. 2 is a section taken on the line 2—2 of Figure 1.

In Fig. 2, it will be noted that because of the shape of the edging, the front edge of the tread is higher than the remainder. This is of advantage since when the passenger boards the vehicle, the arch of his foot is slightly hooked over the edge of the step, thus reducing the danger of the passenger slipping in getting on the vehicle. When the passenger alights, the sole of his foot is again in a slightly elevated position, again reducing the hazard of the passenger slipping or sliding off the step.

The use of the metal insert 17 around which tongue 25 is extruded, and through which the upper metal screws are placed, eliminates any possibility of the edging working loose. Because of the spongy, resilient character of the edging of this invention as contrasted to the rigidity of a metal edging, the danger of the passenger incurring injury as the result of a fall is reduced. For instance, if the passenger should fall so that a shin bone comes into contact with the edge of the step, contact with a soft surface as compared with a hard metal surface would reduce the chances of any injury.

The possibility of the edging working loose by reason of the repeated stepping thereon with the tendency to cause the edging to roll off the tread is reduced because of the novel tongue construction. Each step that contacts the edging and tends to cause it to loosen or roll will also force the portion of tread covering 14 immediately above tongue 25 down onto the tongue with considerable pressure. This pressure temporarily augments the forces holding the edging in place.

It is to be understood that the invention may be embodied in specific forms other than that illustrated without departing from the principle or essential characteristics thereof. The embodiments shown are therefore to be considered as illustrative and not restrictive, the scope of the invention being defined by the appended claims rather than the foregoing description and drawing. All modifications and changes which come within the meaning and range of equivalency of the claims are therefore intended to be included therein.

I claim:

1. A step assembly for a bus or the like comprising a frame subject to constant weaving and warping in the motion of the bus, said frame having a tread and a riser, a covering on said tread and an edging strip for the junction between said tread and said riser including a rubber or like flexible and resilient integral element having a section of substantial length to engage said riser and a section to engage the front edge of said tread, a tongue on said latter section extending beneath said tread covering, and means to secure said edging to said frame including means to secure said tongue beneath said tread covering, and means to secure the section contacting said riser.

2. A step assembly for a bus or the like comprising a frame having a tread and a riser, a covering on said tread, and an edging strip for the junction between said tread and said riser including a flexible integral element having a section to engage said riser and a section to engage the front edge of said tread, a tongue on said latter section, a relatively rigid insert in said tongue, and means to secure said edging to said frame including fastening means in said tongue beneath said tread covering.

3. A step assembly for a bus or the like comprising a frame subject to constant weaving and warping in the motion of the bus, said frame having a tread and a riser, a covering on said tread terminating short of said riser, a flexible and resilient edging strip of rubber or like material for the junction between said tread and said riser comprising a section to engage the front portion of said tread, the latter section being formed with a notch to engage the front edge of said tread covering, and a tongue extending rearwardly beneath said tread covering, said tongue progressively diminishing in thickness to support the front portion of said tread covering at a relatively higher elevation than the remaining portion thereof, a second section extending over said riser for a considerable distance, and means to secure said edging strip to said frame including means to secure said tongue beneath said tread covering, and means to secure said second section to said riser.

4. A step assembly for a bus or the like comprising a frame having a tread and a riser, a covering on said tread terminating short of said riser, an edging strip for the junction between said tread and said riser comprising a section to engage the front portion of said tread, the latter section being formed with a notch to engage the front edge of said tread covering, and a tongue extending rearwardly beneath said tread covering, said tongue progressively diminishing in thickness to support the front portion of said tread covering at a relatively higher elevation than the remaining portion thereof, a relatively rigid insert in said tongue, and means to secure said edging strip to said frame including fastening means engaging said tongue and said insert beneath said tread covering.

5. A step assembly for a bus or the like comprising a frame subject to weaving and warping in the motion of the bus, said frame having a tread and a riser, a covering on said tread terminating short of said riser, a flexible and resilient edging strip of rubber or the like for the junction between said tread and said riser including means to receive and lock the forward edge of said tread covering at a higher elevation than the remainder thereof, said strip being notched to form an overhanging wall to provide said locking means, and means to secure said strip to said tread and said riser.

6. A step assembly for a bus or the like comprising a frame subject to weaving and warping in the motion of the bus, said frame having a tread and a riser, a covering on said tread terminating short of said riser, a flexible and resilient edging strip of rubber or the like for the junction between said tread and said riser including means to receive and lock the forward edge of said tread covering at a higher elevation than the remainder thereof, said strip being notched to form an overhanging wall to provide said locking means, a tongue on said strip extending away from said riser under said tread covering, means to secure said tongue to said tread, and means to secure said edging to said riser.

7. A step assembly for a bus or the like comprising a frame having a tread and a riser, a covering on said tread terminating short of said riser, an edging strip for the junction between said tread and said riser including means to receive and lock the forward edge of said tread covering at a higher elevation than the remainder thereof, said strip being notched to form an overhanging wall to provide said locking means, a tongue on said strip extending away from said riser under said tread covering, a relatively rigid insert in said tongue, and means to secure said insert and said tongue to said frame.

8. A step assembly for a bus or the like comprising a frame subject to constant weaving and warping in the motion of the bus, said frame having a tread and a riser, a covering on said tread, and an edging strip for the junction between said tread and said riser including a rubber or like flexible and resilient integral element having a section of substantial length to engage said riser and a section to engage the front edge of said tread, a tongue on said latter section extending beneath said tread covering, and means to secure said edging to said frame including means to secure said tongue beneath said tread covering, and means to secure the section contacting said riser, said covering being of a predetermined color, and said edging strip being of a contrasting color.

SAMUEL D. MOORE.